United States Patent [19]
Martinelli et al.

[11] Patent Number: 5,791,088
[45] Date of Patent: Aug. 11, 1998

[54] WEATHERSTRIP APPARATUS FOR VEHICLE DOOR WINDOW

[75] Inventors: Douglas Michael Martinelli, Livonia, Mich.; William Ernest Buehler, Toledo, Ohio; Darrell Kenneth Kleinke, Livonia; Christian Michael Norton, Wixom, both of Mich.

[73] Assignee: Ford Global Technologies, Inc., Dearborn, Mich.

[21] Appl. No.: 738,209

[22] Filed: Oct. 25, 1996

[51] Int. Cl.$^6$ ........................................... B60J 1/16
[52] U.S. Cl. ........................................ 49/375; 49/378
[58] Field of Search ........................ 49/374, 375, 376, 49/377, 378

[56] References Cited

U.S. PATENT DOCUMENTS

| | | | |
|---|---|---|---|
| 1,404,048 | 1/1922 | Nicholson | 49/377 |
| 1,456,961 | 5/1923 | Bachle | 49/377 |
| 1,641,157 | 9/1927 | Cook . | |
| 1,888,729 | 11/1932 | Lefevre | 49/377 |
| 1,905,429 | 4/1933 | Ball | 49/376 |
| 1,911,697 | 5/1933 | Levan | 49/377 |
| 1,939,976 | 12/1933 | Graebner | 49/376 |
| 1,954,268 | 4/1934 | Simpson | 196/44 |
| 1,991,017 | 2/1935 | Hickman et al. | 49/376 |
| 2,058,248 | 10/1936 | Menges | 49/377 |
| 2,069,219 | 2/1937 | Conlon | 49/377 |
| 2,090,048 | 8/1937 | Holt et al. | 49/375 |
| 2,184,553 | 12/1939 | Johnson et al. | 296/44 |
| 4,771,575 | 9/1988 | Tiesler | 49/211 |
| 4,949,509 | 8/1990 | Gold | 49/502 |
| 4,962,601 | 10/1990 | Gold | 49/374 |

FOREIGN PATENT DOCUMENTS

| | | |
|---|---|---|
| 3617602A1 | 11/1987 | Germany . |
| 488969 | 1/1954 | Italy . |

*Primary Examiner*—Daniel P. Stodola
*Assistant Examiner*—Curtis Cohen
*Attorney, Agent, or Firm*—David B. Kelley; Roger L. May

[57] ABSTRACT

A vehicle door assembly includes first and second weatherstripping components secured directly to the vertically movable window beneath the opening between the outer door panel and inner door trim panel such that the weatherstrips are not visible. The weatherstrips include upwardly protruding lip portions which cooperate with the base portion of the respective weatherstrip to form a channel for carrying water out of the door assembly. By securing the weatherstripping directly to the window, unsightly beltline weatherstrips are eliminated. Also, the frictional engagement of prior art beltline weatherstrips with the window is eliminated, thereby allowing downsizing of the window lifting mechanism, and allowing the use of plastic or glazed windows because the abrasion of prior art designs is eliminated.

7 Claims, 1 Drawing Sheet

WEATHERSTRIP APPARATUS FOR VEHICLE DOOR WINDOW

TECHNICAL FIELD

The present invention relates to a door assembly for an automotive vehicle, and more particularly to a weatherstrip apparatus for a vehicle door window which is secured directly to the window.

BACKGROUND OF THE INVENTION

Typically, vehicle door assemblies include extruded rubber "beltline seals" or weatherstrips secured to the outer door panel and inner door trim panel and having lip portions extending upwardly and engaged against the vertically movable door window. Such beltline seals provide a sealing function by diverting water away from the opening between the outer door panel and inner door trim panel to prevent water from entering inside the door assembly.

Such beltline seals or weatherstripping components may be unsightly, large black rubber components, which are visible from both inside and outside the vehicle. These components may create an aesthetics problem in vehicle design.

A further problem with such beltline seals is that they are designed to rub directly against the window. This rubbing creates an abrasion problem if the window has a plastic or glazed surface because the continuous rubbing of the beltline seal against the plastic or glazing will cause streaking or other unsightly abrasion marks on the surface of the window. This rubbing problem has greatly slowed the transition of vehicle door windows from glass to a glass/plastic or all plastic material.

It is desirable to provide a vehicle door assembly which eliminates the problem of the weatherstripping rubbing against the vehicle glass, and it is also desirable to eliminate the weatherstripping from sight without loss of functionality.

DISCLOSURE OF THE INVENTION

The present invention overcomes the above-referenced shortcomings of prior art vehicle door window assembly designs by providing a weatherstripping apparatus comprising inner and outer weatherstrips which are bonded directly to the window. The weatherstrips of the present invention include upwardly protruding lips which form a channel in combination with the base of the weatherstrips for channeling water out of the door assembly. The weatherstrips are bonded to the window in a position beneath the opening between the outer door panel and inner door trim panel such that the weatherstrips are not visible from inside or outside the vehicle.

More specifically, the present invention provides a weatherstrip apparatus for a vehicle door window which is vertically movable between closed and open positions through a door opening formed by an outer door panel and an inner door trim panel, the outer door panel and inner door trim panel each having an inner sheet metal component secured thereto. The apparatus comprises first and second weatherstrips secured to opposing sides of the window. The weatherstrips each include a base portion secured to the window and an elongated lip portion extending upwardly and away from the base portion to form a channel in cooperation with the base portion for channeling water out of the door. The first and second weatherstrips are positioned on the window beneath the door opening between the outer door panel and inner door trim panel such that the weatherstrips are not visible from outside the vehicle.

Accordingly, an object of the present invention is to provide a vehicle door window weatherstripping apparatus which includes weatherstrips which are not visible in the vehicle and do not rub against the window as the window moves vertically.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
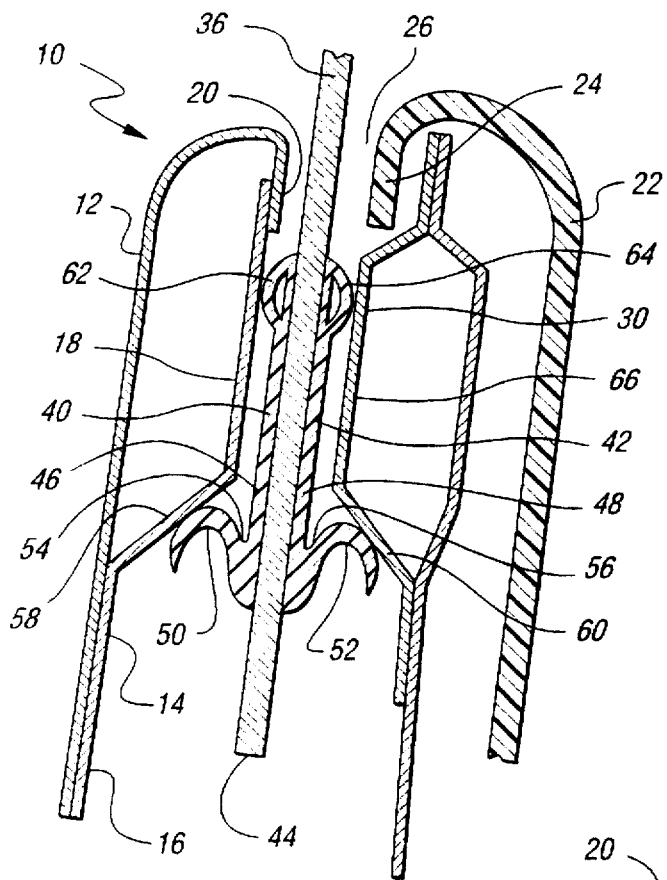
FIG. 1 shows a cut-away vertical cross-sectional view of a vehicle door assembly in accordance with the present invention with the window in the closed position.
Figure 2:
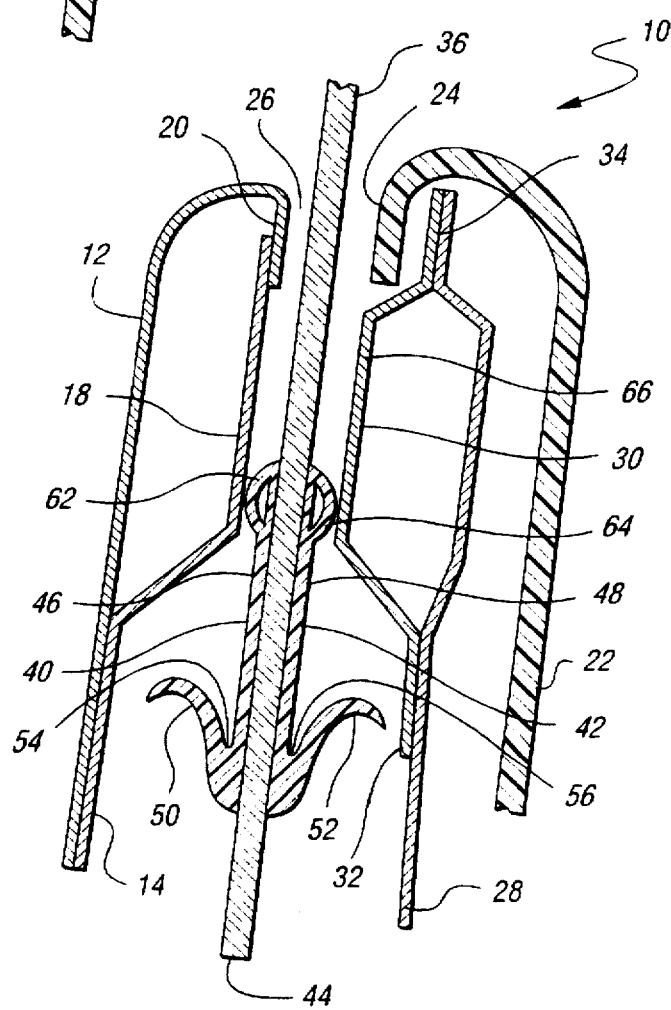
FIG. 2 shows a cut-away vertical cross-sectional view of the door assembly of FIG. 1 with the window slightly offset from the closed position.

Referring to FIGS. 1 and 2, a vehicle door assembly 10 is shown in accordance with the present invention. The door assembly 10 comprises an outer door panel 12, which is typically a sheet metal component, which includes an inner sheet metal component 14 secured thereto. The inner sheet metal component 14 includes a wall portion 16 which is glued to the outer door panel 12, as well as an upper portion 18 which is welded to the downturned leg portion 20 of the outer door panel 12.

The vehicle door assembly 10 further includes an inner door trim panel 22, which is typically an injection molded plastic component, and includes a downturned leg portion 24 which cooperates with the downturned leg portion 20 of the outer door panel 12 to form a window opening 26. The inner door trim panel 22 includes an inner sheet metal component 28 secured thereto. A secondary sheet metal component 30 is welded to the sheet metal component 28 at the legs 32,34.

The door assembly 10 further includes a window 36 which is vertically movable between closed and open positions through the window opening 26. FIG. 1 shows the door assembly 10 with the window 36 in the closed position, and FIG. 2 shows the door assembly 10 with the window 36 slightly offset from the closed position of FIG. 1.

The present invention is embodied in the first and second extruded rubber weatherstrips 40,42 which are bonded directly to the window 36 near the lower edge 44 of the window 36. The first and second weatherstrips 40,42 each include a base portion 46,48 secured to the window with a lip portion 50,52 extending therefrom, respectively, to form a pair of channels 54,56 running the length of the first and second weatherstrips 40,42 for carrying water out of the door assembly 10 after it has entered the door assembly through the window opening 26.

With the window 36 in the closed position, as shown in FIG. 1, the lip portions 50,52 of the first and second weatherstrips 40,42 engage the angled portions 58,60 of the inner sheet metal component 14 and second sheet metal component 30, respectively, to form a seal therebetween.

Many drivers, particularly those who smoke, prefer to have the vehicle door window 36 in a position slightly offset from the closed position for improved ventilation, such as shown in FIG. 2. Accordingly, in order to prevent rattling in such a slightly open window position, the first and second weatherstrips 40,42 further include bumper portions 62,64, respectively, for engagement against the upper portion 18 of the inner sheet metal component 14 and the wall portion 66 of the second sheet metal component 30, respectively, for preventing rattles when the window 36 is slightly open, as shown in FIG. 2.

Accordingly, by bonding the weatherstrips 40,42 directly to the window 36, the problem of abrasion and friction caused by vertically movable windows traveling up and down between the prior art door belt weatherstrips is eliminated. The elimination of this friction will allow the window lifting mechanism to be downsized. Furthermore, use of non-traditional plastic-coated or glazed materials in the windows which are not currently feasible due to scratching as the window cycles, may allow further downsizing of the lifting mechanism. The other non-functional benefit of the present invention is the improved appearance due to the elimination of visible seals along the opening 26 between the outer door panel 12 and inner door trim panel 22.

While the best mode for carrying out the invention has been described in detail, those familiar with the art to which this invention relates will recognize various alternative designs and embodiments for practicing the invention within the scope of the appended claims.

What is claimed is:

1. A weatherstrip apparatus attached to a vehicle door window which is vertically movable between closed and open positions through a door opening formed by an outer door panel and an inner door trim panel, the outer door panel and inner door trim panel each having an inner sheet metal component secured thereto, the apparatus comprising:

first and second weatherstrips secured to opposing sides of the window, said weatherstrips each having a base portion secured to the window and an elongated lip portion extending vertically upwardly and away from the base portion to form, in cooperation with the base portion, a channel for channeling water out of the door, said first and second weatherstrips being positioned on the window beneath the door opening between the outer door panel and inner door trim panel such that the weatherstrips are not visible from outside the vehicle.

2. The apparatus of claim 1, wherein said lip portions are configured to engage against the respective inner sheet metal component for sealing when the window is in the closed position.

3. The apparatus of claim 1, wherein each said weatherstrip further comprises a bumper portion extending from the base for engagement with the respective inner sheet metal component to prevent rattling when the window is slightly offset from the closed position.

4. A vehicle door assembly, comprising:

an outer door panel having an inner sheet metal component secured thereto;

an inner door trim panel having an inner sheet metal component secured thereto, the inner door trim panel and outer door trim panel cooperating to form an opening therebetween;

a door window vertically movable between closed and open positions through said opening; and first and second weatherstrips secured to opposing sides of the window, said weatherstrips each having a base portion secured to the window and an elongated lip portion extending vertically upwardly and away from the base portion to form, in cooperation with the base portion, a channel for channeling water out of the door, said first and second weatherstrips being positioned on the window beneath the door opening between the outer door panel and inner door trim panel such that the weatherstrips are not visible from outside the vehicle.

5. The assembly of claim 4, wherein said lip portions are configured to engage against the respective inner sheet metal component for sealing when the window is in the closed position.

6. The assembly of claim 5, wherein each said weatherstrip further comprises a bumper portion extending from the base for engagement with the respective inner sheet metal component to prevent rattling when the window is slightly offset from the closed position.

7. A weatherstrip apparatus for a vehicle door window which is vertically movable between closed and open positions through a door opening formed by an outer door panel and an inner door trim panel, the outer door panel and inner door trim panel each having an inner sheet metal component secured thereto, the apparatus comprising:

first and second weatherstrips secured to opposing sides of the window, said weatherstrips each having a base portion secured to the window and an elongated lip portion extending vertically upwardly and away from the base portion to form, in cooperation with the base portion, a channel for channeling water out of the door, said first and second weatherstrips being positioned on the window beneath the door opening between the outer door panel and the inner door trim panel such that the weatherstrips are not visible from outside the vehicle, said lip portion being configured to engage against the respective inner sheet metal component for sealing when the window is in the closed position, and each said weatherstrip further comprising a bumper portion extending from the base for engagement with the respective inner sheet metal component to prevent rattling when the window is slightly offset from the closed position.

\* \* \* \* \*